(Model.)  3 Sheets—Sheet 1.

A. RUNSTETLER.
Corn Planter.

No. 238,162.  Patented Feb. 22, 1881.

Witnesses:
Fred. G. Dieterich
P. C. Dieterich

Inventor:
Andrew Runstetter
By W. B. Richards
attorney (Model.) 3 Sheets—Sheet 2.

A. RUNSTETLER.
Corn Planter.

No. 238,162. Patented Feb. 22, 1881.

Witnesses.
Fred G. Dieterich
P. C. Dieterich

Inventor:
Andrew Runstetler
By W. B. Richards,
attorney (Model.)

3 Sheets—Sheet 3

A. RUNSTETLER.
Corn Planter.

No. 238,162.                    Patented Feb. 22, 1881.

Witnesses:
Fred G. Dieterich
P. C. Dieterich.

Inventor:
Andrew Runstetler
By W. B. Richards
Attorney.

UNITED STATES PATENT OFFICE.

ANDREW RUNSTETLER, OF MOLINE, ILLINOIS, ASSIGNOR TO FARMERS FRIEND MANUFACTURING COMPANY, OF DAYTON, OHIO.

CORN-PLANTER.

SPECIFICATION forming part of Letters Patent No. 238,162, dated February 22, 1881.

Application filed November 27, 1880. (Model.)

*To all whom it may concern:*

Be it known that I, ANDREW RUNSTETLER, a citizen of the United States, residing at Moline, in the county of Rock Island and State of Illinois, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, in which—

Figure 1:
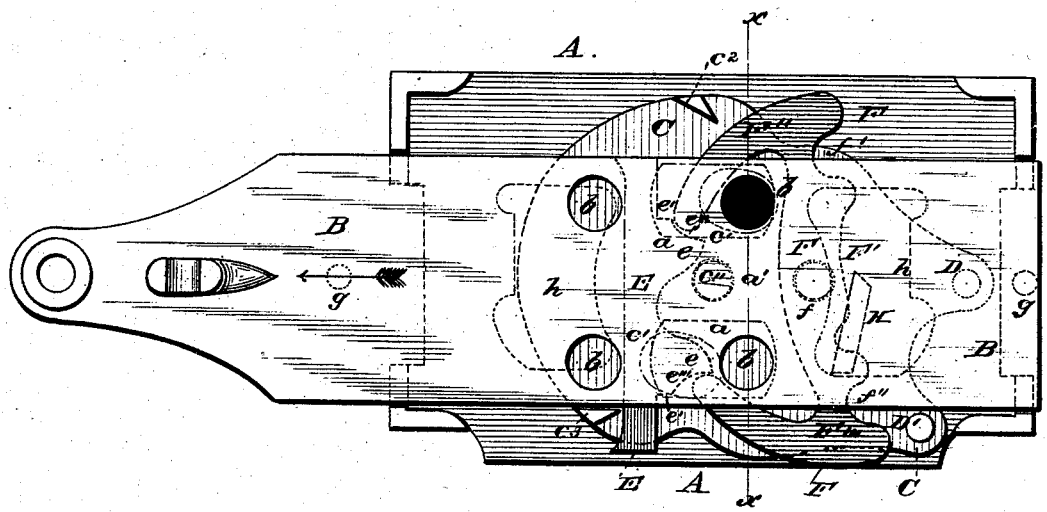
Figure 2:
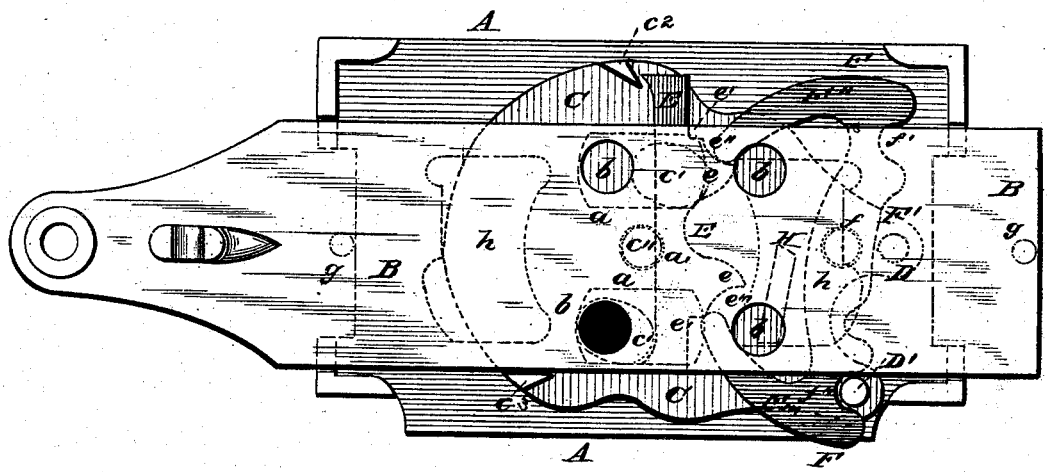
Figure 3:
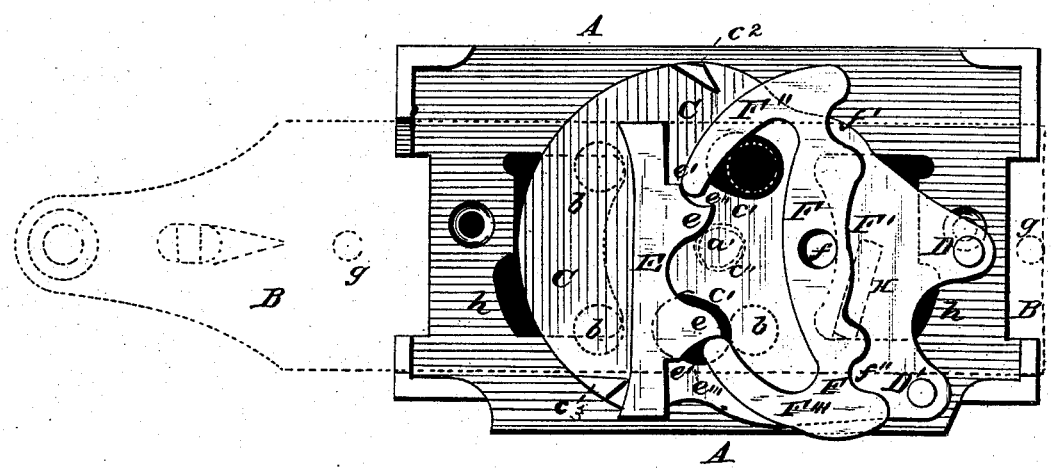
Figure 4:
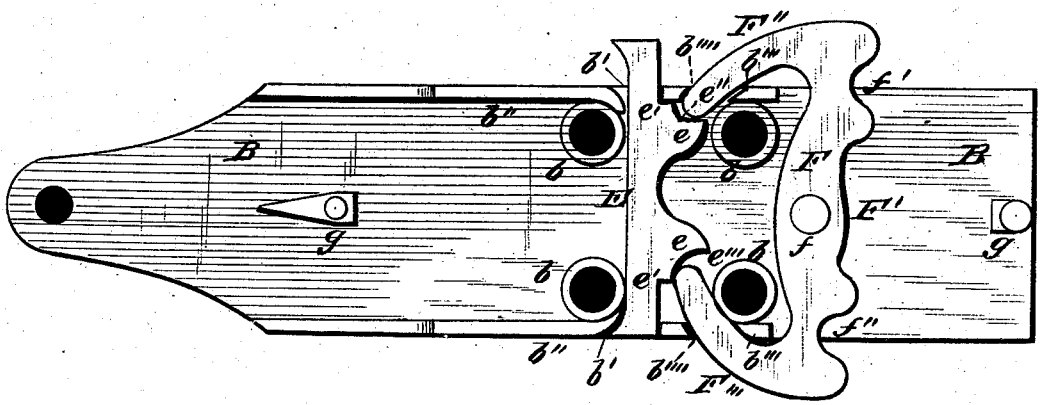
Figure 5:
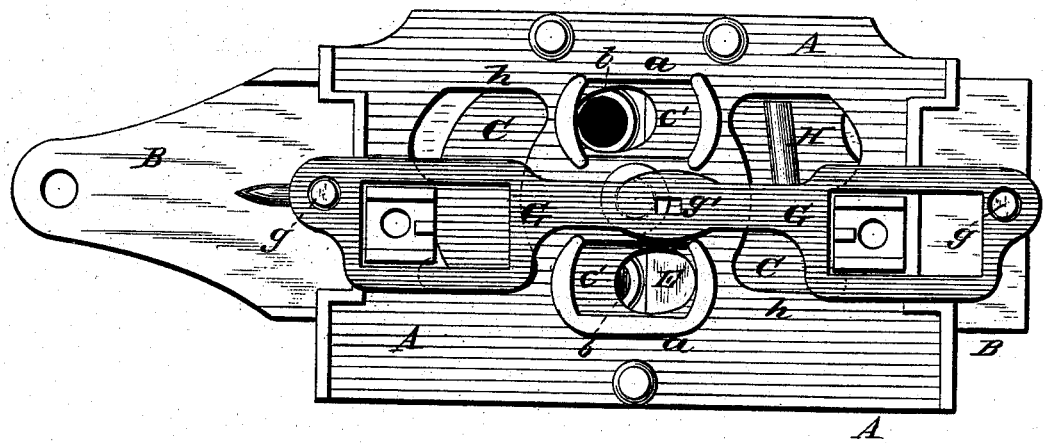
Figure 6:
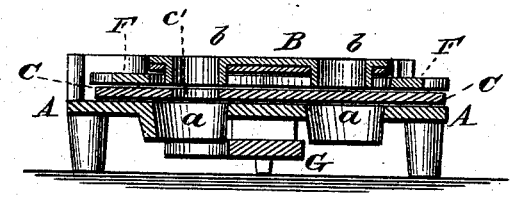
Figure 7:
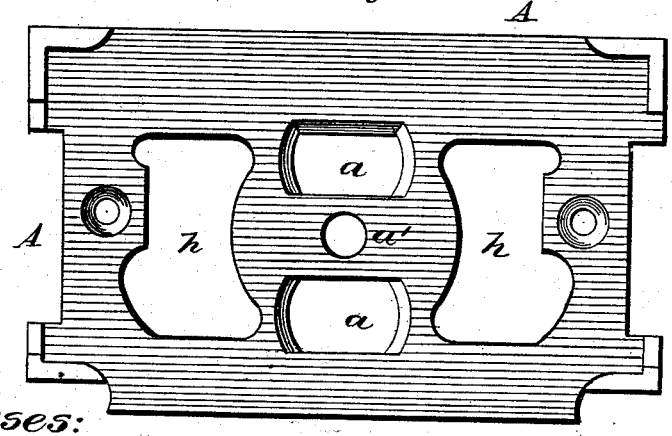

Figure 1 is a top plan of the bottom of a corn-planter seed-box containing my improvements as shown when the cap-plate and cut-offs are removed. Fig. 2 is the same plan as Fig. 1, but the parts shown in different relative positions from Fig. 1. Fig. 3 is the same plan as Fig. 1, shown with the seed-cup slide in dotted lines. Fig. 4 is a plan of the seed-cup slide and the sliding and rocking tappets, seen from below. Fig. 5 is a plan of the bottom A and the auxiliary slide, seen from below. Fig. 6 is a sectional elevation in the line $x\ x$ in Fig. 1. Fig. 7 is a top plan of the bottom plate, A.

This invention relates to corn-planters having four chamber-slides, or slides which reciprocate in a direct line, and have four seed-cups, beneath which a valve-plate is oscillated, as shown in patent to M. Runstetler, No. 226,116.

In corn-planter seeding devices of this class as heretofore constructed, the sliding cam or tappet which imparted movement to the oscillating valve below the seed-slide has itself been actuated by a cam-lug sliding in frictional contact with its cam-faces; and my improvement consists, in its most essential feature, in imparting movement to the sliding tappet which actuates the oscillating valve by means of a rocking plate located between the seed-cup slide and the oscillating valve below it.

The invention further consists in constructions and combinations of parts hereinafter described, and set forth in the claims hereto annexed.

Referring to the drawings by letter, the same letter indicating the same part in the different figures, letter A represents the bottom plate of a corn-planter seed-box having the usual ways and guides for a slide-bar, B, which reciprocates in a right line thereon. The plate A has slots $a\ a$, for the passage of the seed, and a bearing-hole, $a'$, substantially the same as the Patent No. 226,116.

C is a valve-plate, provided with holes $c'\ c'$, for the passage of the seed, and a stud-bolt, $c''$, by which it is journaled to the bottom A in the bearing or hole $a'$, so that it may be oscillated in a horizontal plane. The oscillating valve C is located between the slide B and plate A, and pivoted to the plate A, and provided with lugs $c^2\ c^3$ on its upper side, in substantially the same manner as shown and described in the patent hereinbefore referred to, and the relative movements of the slide B and valve C and result of dropping charges of seed consecutively from the four seed-cups $b$ in the slide B are also substantially the same as shown and described in said patent, and need not be described in detail here.

D D' are short studs on the upper side of the oscillating valve C.

E is a sliding tappet located between the seed-cup slide and valve C in grooves $b'$, which are in ledges $b''$ on the under side of the slide B. The tappet E has lugs $e$ projecting from one of its sides, each with a shoulder, $e'$, and face $e''\ e'''$, respectively.

F is a rocking plate or tappet located between slide B and valve C, and journaled at $f$ to the slide B. The tappet F is formed of a bar, F', with vertical grooves $f'\ f''$ in its side toward the lugs D D', and curved arms F'' F''' projecting from each end at its other side. The ends of the bar F' project beyond the slide B and strike against shoulders $b'''$ in the ledges $b''$, to limit the oscillations of the tappet F on the journal $f$. The arms F'' F''' extend inward beneath the slide B through grooves $b''''$ in the ledges $b''$.

G is a bar located centrally beneath the bottom A, and attached at its ends to the lower ends of studs $g$, which project downward from the slide B. The bar G has a central hole or slot, $g'$, which receives the upper end of the ordinary discharge-valve in the seed-tube.

Thus the bar G reciprocates with the slide B and imparts the necessary movements to the discharge-valve.

The extent of throw of the slide B is limited, in the ordinary manner, by the studs $g$ striking the ends of the plate A, and the extent of the oscillations of the plate C are limited by a stud, H, on its lower side striking alternately the opposite sides of a slot, $h$, in the plate A, in same manner as in patent hereinbefore referred to.

By making a slot, $h$, on each side of the bearing $a'$, as shown at Fig. 7, the plate C and slide B may be reversed on the plate A, and the slide enter it at either side. The sliding tappet E and rocking tappet F reciprocate with the slide B.

At Fig. 1 the slide B is shown as having completed a throw toward the left-hand side of plate A, and in making said throw one end of the tappet E was forced against the lug $c^3$, so as to swing the plate C on its axis $c''$ into the position shown at Fig. 1, (in which figure the working parts below the slide B are shown in dotted lines,) and thereby bring one of the seed-cups $b$ to register with a hole, $c'$, in the plate C, and with a hole, $a$, in the plate A and beneath the cut-off, (not shown,) to discharge its contained seed, in the usual manner. In making a throw toward the right hand from the position shown at Fig. 1, the groove $f''$ of the tappet F is forced against the lug $D'$, which swings the tappet F and forces its arm $F'''$ against the face $e'''$ of a lug, $e$, and thereby pushes or forces the sliding tappet E over to the other side of the slide B, as shown at Fig. 2. In making the throw to the right, as last described, it will be seen that the plate C was not moved, but another seed-hole in the slide was made to discharge its seed. In making a throw of the slide B to the left hand from the position at the right hand last described, the other end of the sliding tappet E will now act on the lug $c^2$ and swing the plate C back to the other side in its original position; and making a throw of the slide B then again to the right hand will bring the groove $f'$ against the lug D and force the arm $F''$ against the face $e''$ of a lug, $e$, and thereby force the sliding tappet E again over to the position shown at Fig. 1 and in position to act on the lug $c^3$ when the slide B is again moved toward the left hand, as hereinbefore described.

The seed-cup holes $b$ are made to register with the holes $c'$ $c'$ in the plate C and holes $a$ in the plate A at every throw of the slide B, in same manner as in the patent hereinbefore referred to.

The movements of the sliding tappet E lengthwise of itself and transversely to the slide B are limited by the shoulders $e'$ coming in contact with the ledges $b''$.

What I claim as new, and desire to secure by Letters Patent, is—

1. In combination with the swinging valve C, sliding tappet E, and seed-cup slide B, the rocking tappet F, adapted to give a reciprocating movement to the tappet E, substantially as and for the purpose specified.

2. The rocking tappet F, journaled to the seed-cup slide, and adapted to give a reciprocating movement to the tappet E transversely to the slide B, substantially as and for the purpose specified.

3. The combination, with a seed-cup slide and oscillating valve located beneath it, of a sliding tappet adapted to give movement to said oscillating valve, and a rocking tappet journaled to the seed-cup slide and adapted to give movement to the sliding tappet.

4. In a corn-planter, the following interacting parts, viz: a seed-cup slide carrying with its throws a sliding tappet, E, and a rocking tappet, F, said sliding tappet adapted to oscillate a valve, C, and said rocking tappet adapted to reciprocate the tappet E transversely to the seed-cup slide, and to receive its own rocking movements from contact with lugs on the valve C, combined to operate for the purpose specified.

5. In combination with a seed-cup slide, sliding tappet E, and rocking tappet F, the valve C, having lugs $c^2$ $c^3$, on which the tappet E acts, and lugs D D', which act upon the rocking tappet F, substantially as and for the purpose specified.

6. In combination with a slide having seed-cups, and a sliding tappet, E, having lugs $e$, a rocking tappet, F, having arms $F''$ $F'''$, which coact with the lugs $e$, to give a reciprocating movement to said tappet E, substantially as and for the purpose specified.

7. In combination with the slide B, oscillating valve E, located beneath it, and mechanism for imparting movement to said valve E, a slide, G, connected with the slide B, and adapted to impart movement to the discharge-valve, substantially as and for the purpose specified.

In testimony whereof I affix my signature in presence of two witnesses.

ANDREW RUNSTETLER.

Witnesses:
H. A. ALLEN,
HARRY M. RICHARDS.